United States Patent [19]

Stradling

[11] Patent Number: 4,602,434

[45] Date of Patent: Jul. 29, 1986

[54] CIRCULAR CUTTING DEVICE

[76] Inventor: Hugh D. Stradling, 1083 Goodwin Dr., Lexington, Ky.

[21] Appl. No.: 458,487

[22] Filed: Jan. 17, 1983

[51] Int. Cl.⁴ .............................................. B27B 5/02
[52] U.S. Cl. ....................................... 30/372; 30/310; 83/439; 83/477.2; 83/490; 83/835; 144/24
[58] Field of Search ............ 83/676, 835, 853, 411 R, 83/490, 439; 30/300, 310, 371, 372; 144/33, 24; 408/201, 204

[56] References Cited

U.S. PATENT DOCUMENTS

| | | | |
|---|---|---|---|
| 102,920 | 5/1870 | Dana | 144/33 |
| 501,404 | 7/1893 | Brenner | 144/33 |
| 617,005 | 1/1899 | Wood | 83/411 R |
| 1,299,688 | 4/1919 | DeLong | 83/490 |
| 1,924,717 | 8/1933 | Hall | 30/300 |
| 2,111,986 | 3/1938 | Modin | 83/676 X |
| 2,720,897 | 10/1955 | Kairath | 83/439 |
| 4,398,440 | 8/1983 | Epstein | 83/411 R |

Primary Examiner—James M. Meister
Attorney, Agent, or Firm—Edward M. Steutermann

[57] ABSTRACT

A circular sawblade useful in cutting circular figures from a planar material utilizing a power source to rotate the sawblade where the blade has a selected degree of concativity to accommodate the radius of the circular figure to be cut from the planar material. The present invention further comprehends a saw device to mount the blade for rotation where the cutting plane of the material can be selectively adjusted with respect to the degree of concativity of the sawblade to selectively adjust the angle between the surface cut by the blade and the planar surface of the material.

1 Claim, 8 Drawing Figures

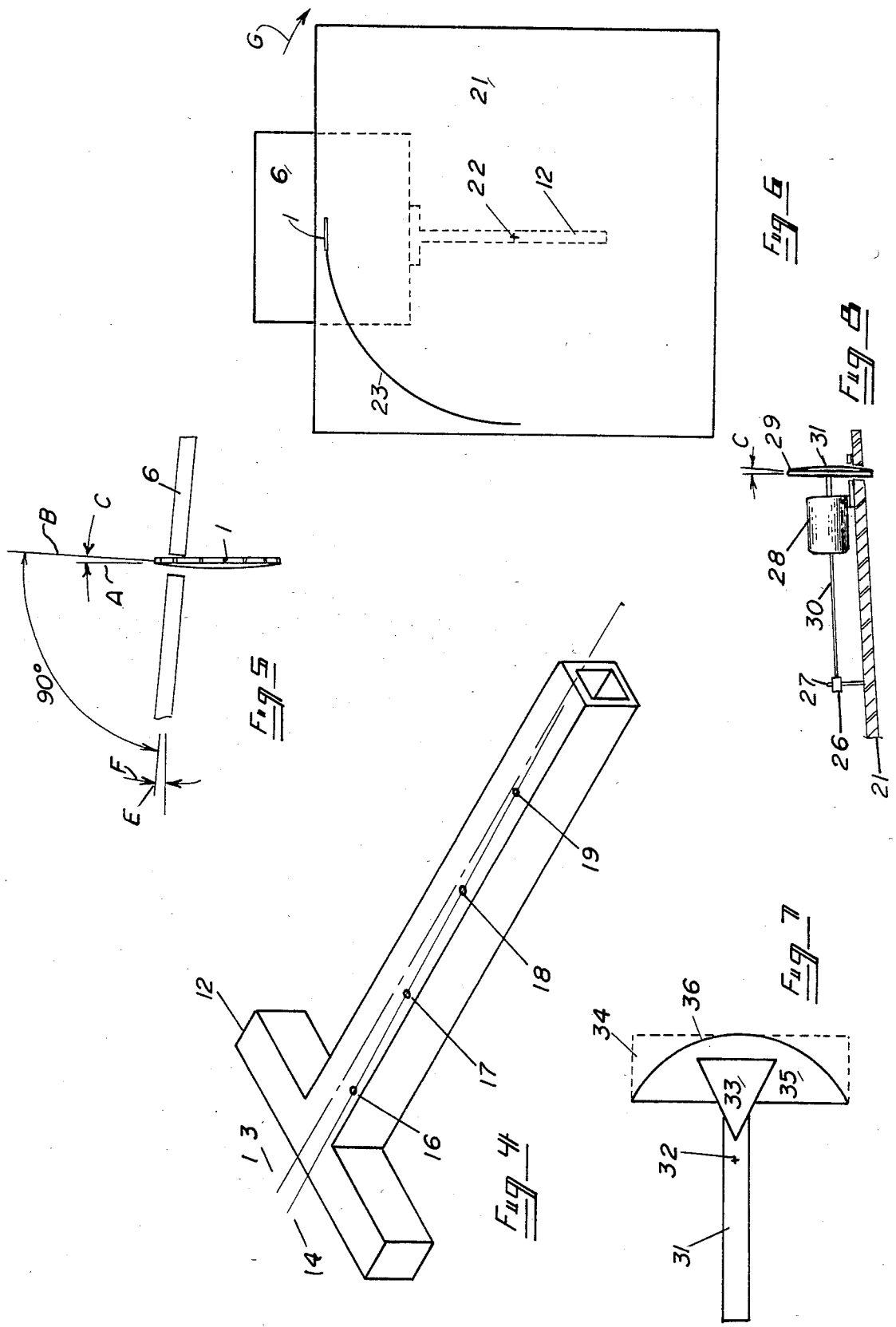

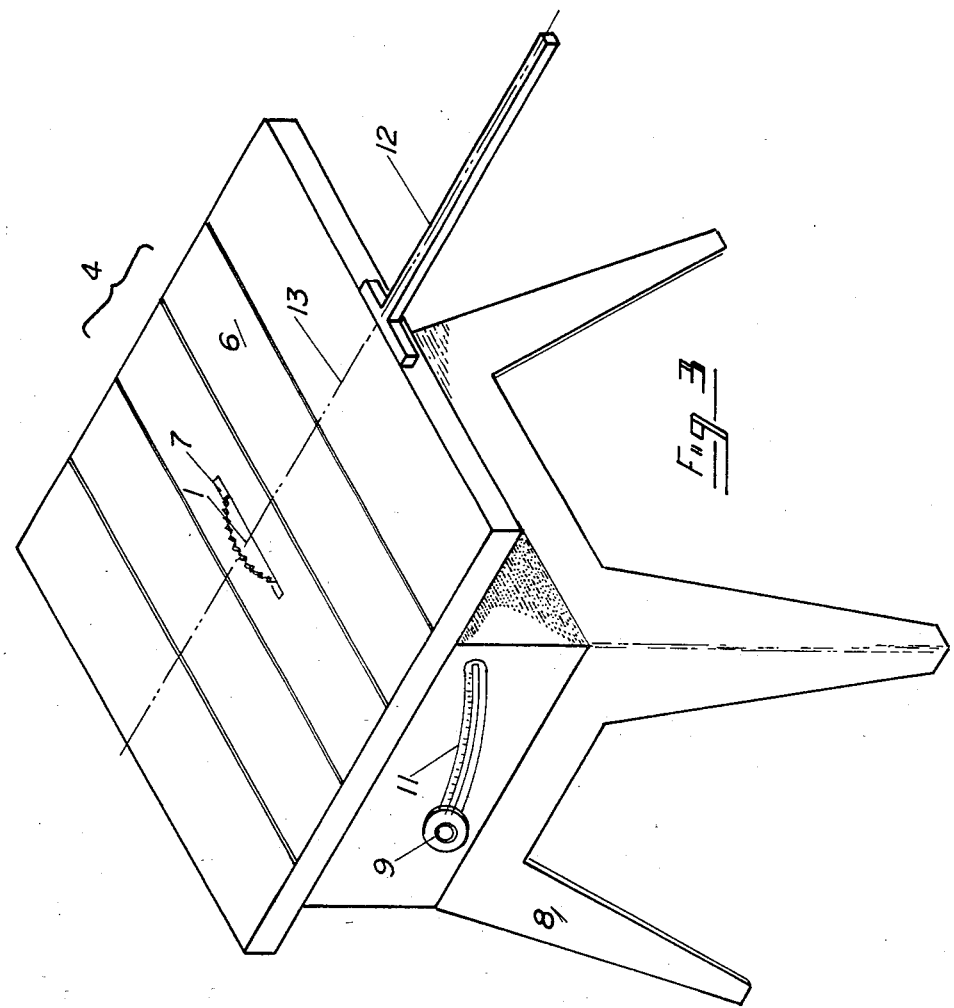
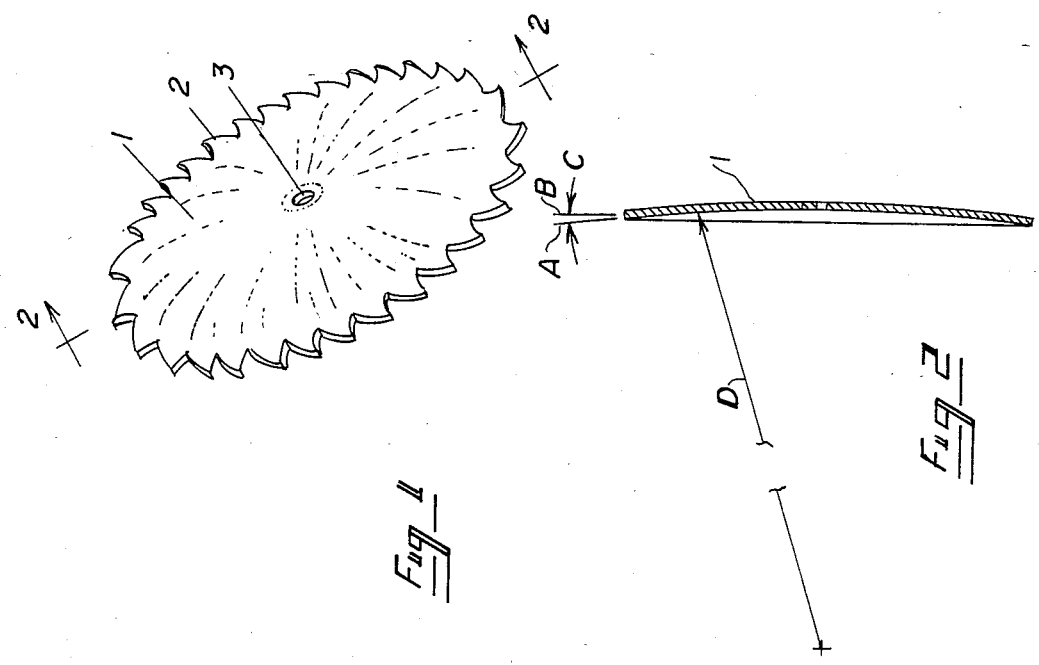

CIRCULAR CUTTING DEVICE

BACKGROUND OF THE INVENTION

The present invention relates to cutting of circular sawblades and apparatus for the use thereof.

More particularly, the present invention relates to a new, useful and novel sawblade which is particularly useful in connection with cutting circular objects from planar materials when the saw blade is properly mounted with respect to a driving mechanism.

Heretofore, circular planar objects such as table tops, the opposite end plates of large wire reels, and other circular devices have generally been cut from planar material, for example plywood, or other suitable planar materials, by scribing a circle on the material and then cutting along the scribed circle with an elongate sawblade either a reciprocating sawblade or a band sawblade where a blade loop is utilized and transverses a series of pulleys to provide the necessary separation between the cutting and return sides of the blades.

In either case it has been necessary to finish the object and to smooth the cuts by means of sanders or other devices where the likelihood of oversanding is present which would then in effect prevent the attainment of truly circular smooth outlines.

Further, and most importantly, such prior art methods have been extremely expensive in that a great deal of labor is consumed in first cutting and then finishing the cutting edge of the material so that use of circular material has been prohibitive in some instances.

Further, in connection with the manufacture of the ends for wire reels, it has been necessary to "build up" the ends because of the labor expense involved in cutting circular objects.

No prior art arrangement, device, or method is known to facilitate cutting a circular design from a planar material utilizing a common tablesaw or utilizing a portable saw where the only modification absolutely required is a sawblade as provided by the present invention.

SUMMARY OF THE INVENTION

The present invention provides a new, useful and inexpensive means for cutting circular outline objects from planar materials. Moreover, devices within the scope of the present invention utilized saw drive arrangements presently in existance without substantial modification and in essence provide a sawblade which is adapted to cut a circular outline.

Arrangements and methods within the scope of the present invention are inexpensive to fabricate and are utilized to cut circular patterns and planar materials without the use of excessive amounts of labor. In fact, in one instance a 4 foot diameter circular object has been cut from 1 inch plywood in less than 2 minutes where the edges of the object were properly angled with respect to the planar surface and the edge was "true" enough that no sanding was required to achieve a perfectly circular configuration.

More particularly, the present invention provides a circular sawblade useful in cutting circular figures from a planar material utilizing a power source to rotate the sawblade where the blade has a selected degree of concativity to accommodate the radius of the circular figure to be cut from the planar material. The present invention further comprehends a saw device to mount the blade for rotation where the cutting plane of the material can be selectively adjusted with respect to the degree of concativity of the sawblade to selectively adjust the angle between the surface cut by the blade and the planar surface of the material.

Various arrangements will occur to those skilled in the art upon reading the disclosure set forth hereinafter. However, a few examples in accordance with the present invention are illustrated in the accompanying figures.

BRIEF DESCRIPTION OF THE DRAWINGS

In the examples within the scope of the present invention shown in the illustration:

FIG. 1 is a perspective view of a concave sawblade within the scope of the present invention;

FIG. 2 is a view taken along a plane passing through line 2—2 of FIG. 1;

FIG. 3 is a perspective view of a tablesaw with a sawblade within the scope of the present invention carried therein;

FIG. 4 is an enlarged view of a T-bar construction utilized in the example shown in FIG. 3;

FIG. 5 is a schematic illustration of the orientation of a tablesaw top and sawblade within the scope of the present invention;

FIG. 6 is an illustration of a cutting operation utilizing a device within the scope of the present invention;

FIG. 7 is an illustration of a jig to produce a segment of an arc by use of a device within the scope of the present invention;

FIG. 8 is an illustration of one method within the the scope of the present invention to utilize a circular hand saw to accomplish the objectives of the present invention.

DETAILED DESCRIPTION OF THE DRAWINGS

Referring to FIGS. 1 and 2 which illustrate a sawblade within the scope of the present invention, a circular blade 1 is provided having peripherial edge teeth 2 as is known in the art for cutting as the blade 1 is rotated. A central opening 3 is provided to receive an arbor to hold the saw blade in position and to facilitate rotation thereof by means of the arbor shaft.

In accordance with one feature of the present invention, blade 1 is bowed as shown in FIG. 2 which is a cross section passing along a plane passing through line 2—2 of FIG. 1. The angular orientation of the blade as represented by line A with respect to line B which is, for example, a line representing the plane of the blade, results in an angle C which represents the degree of bow or concativity of the blade. The blade can be bowed on a radius D as shown where the diameter D determines the angle C which is determined by the relative position of line A with respect to line B. It will be understood that the diameter of the concavivity of the blade will be somewhat variable according to the diameter of the material to be cut with the blade. For example, in the case of a blade designed to cut an object having a diameter of approximately 4 feet it has been found that angle B can advantageously be 5 degrees. Considerable latitude is allowed however, so that one blade can be having a selected degree of concativity, or slope with respect to the plane of the blade, can be utilized to cut a wide variety of diameter objects. The principal requirement is that the blade have some concativity to allow accommodation of the arc of the cut of the material.

With reference to FIG. 3, blade 1 is shown in position in a tablesaw 4 having a table 6 where saw 1 is received through a slot 7 as is known in the art. In the arrangement shown table 6 is supported on a frame 8. As further known in the art table 6 is angularly adjustable to provide selected angular disposition between the plane of blade 1 and the surface of table 6 to accommodate various angles at the cutting edge of materials to be cut on table 6. In this regard an adjustment knob 9 is shown to be moved along a radiant 11 to selectively position table 6 with respect to blade 1.

In accordance with another feature of the present invention an extension can be provided to receive the material to be cut. In the example shown in FIG. 3 a T-bar 12 has been provided with its longitudinal axis provided along a plane passing through a line 13 which likewise passes through the arbor shaft (not shown) of sawblade 1 so that there is general alignment between the longitudinal axis of T-bar 12 and the axis of the arbor shaft of Table 4.

T-bar 4 is illustrated in greater detail in FIG. 4 where line 13 is illustrated along with a line 14 which is offset angularly from line 13. Holes 16, 17, 18 and 19 are shown in spaced relation along line 14 where the separation between line 14 and line 13 is greater toward the cross bar of T-bar 12 and where the two lines nearly coincide at the end of the shank of T-bar 12. The holes 16-19 are utilized to receive pivot pins for rotation of the material to be cut on Table 6 by blade 1. In this regard it has been found that for lower diameters it is helpful if the pivot center is offset slightly forward of the centerline 13 for smaller radius and where the pivot center approaches the line 13 as the radius of the cut increases.

FIG. 5 illustrates pictorially the relationship between table 6 and blade 1 where the line A, representing the general plane of blade 1 is shown along with line B which represents the plane of the outer cutting edge of blade 1 again illustrating an angle C therebetween. The angle between line B and the surface E of cutting table 6 should be a right angle as illustrated in FIG. 5 so that the angle of inclination of the table F is equal to the angle C or in this case, for example 5 degrees.

FIG. 6 illustrates the method utilizing connection with the present invention where the material to be cut 21 is placed on the table 6 with blade 1 dropped beneath the surface of table 6. A pin 22 is provided in the material 21 and is inserted in, for example, one of the holes 16, 17, 18 and 19 depending upon the radius of the cut to be made. Pin 21 can be as simple as a nail driven through the material and dropped into the appropriate pivot hole in T-bar 12.

In operation, the material 21 to be cut is placed as shown in FIG. 6 with pin 22 extending through one of the holes 16-19. Operation of the sawblade is commenced and the table lowered so that the blade 1 cuts through the material to be cut. The material to be cut 21 is then rotated about pivot 22 in the direction shown by arrow G so that a circular cut 23 is made in the material until the material has been rotated 360 degrees and the blade meets the cut line resulting in a perfectly circular object.

While devices within the scope of the present invention have been discussed with reference to a tablesaw and also with respect to an extension such as T-bar 12, it will be understood that lathes within the scope of the present invention can be utilized in any device utilizing circular sawblades. For example, FIG. 8 is an illustration of a device using a circular handsaw where the material 21 to be cut is provided with a pin 27 secured in the material to be cut and connected to a cutting device 28, for example a hand held circular power saw, by means of an arm 30 which can be a cable or a flat bar. Arm 30 can be connected to pin 27 by a pivot 26. Cutting device 28 includes a blade 31 in accordance with the present invention bowed to an angle C and a serrated cutting edge 29. The handsaw is then moved around the material guided by arm 30 to again provide a circular object.

Further, devices within the scope of the present invention can be utilized to cut objects having the shape of a chord of an circle.

FIG. 7 is an illustration of one such device where a bar 31 is provided having a pivot 32 and a clamp 33 to hold a piece of material having the general shape 34 in order to cut out a chord 35 of an arc as illustrated. In use of the device shown in FIG. 7 on the device shown in FIG. 6 the pivot 32 would be inserted into one of the holes 16-19 of the T-bar the material 38 would be contained in clamp 33 and bar 31 would then be rotated in the direction shown by arrow G to provide a circular cut 36 at the outer periphery of the material so that the resulting pattern is achieved.

It will be understood that the foregoing are but a few examples in accordance with the present invention and that various other arrangements also within the scope of the present invention will occur to those skilled in the art upon reading the disclosure set forth hereinbefore.

The invention claimed is:

1. A circular sawblade to cut a selected planar material around a portion of a circle having a generally circular periphery, teeth members provided around the periphery of said saw blade where the blade is concave in cross-section wherein said sawblade lies in a first plane and wherein the teeth members of said sawblade lie in a second plane located at an acute angle relative to said first plane and wherein said surface of said material to be cut is disposed to provide a generally right angle between said surface of said material to be cut and said second plane and motive means to rotate said sawblade about an axis perpendicular to said first plane and wherein said motive means is connected to pivot means carried by a sheet of material to be cut and wherein sawblade is moved about said pivot point to provide a generally circular cut in said material to be cut.

* * * * *